Patented Oct. 24, 1939

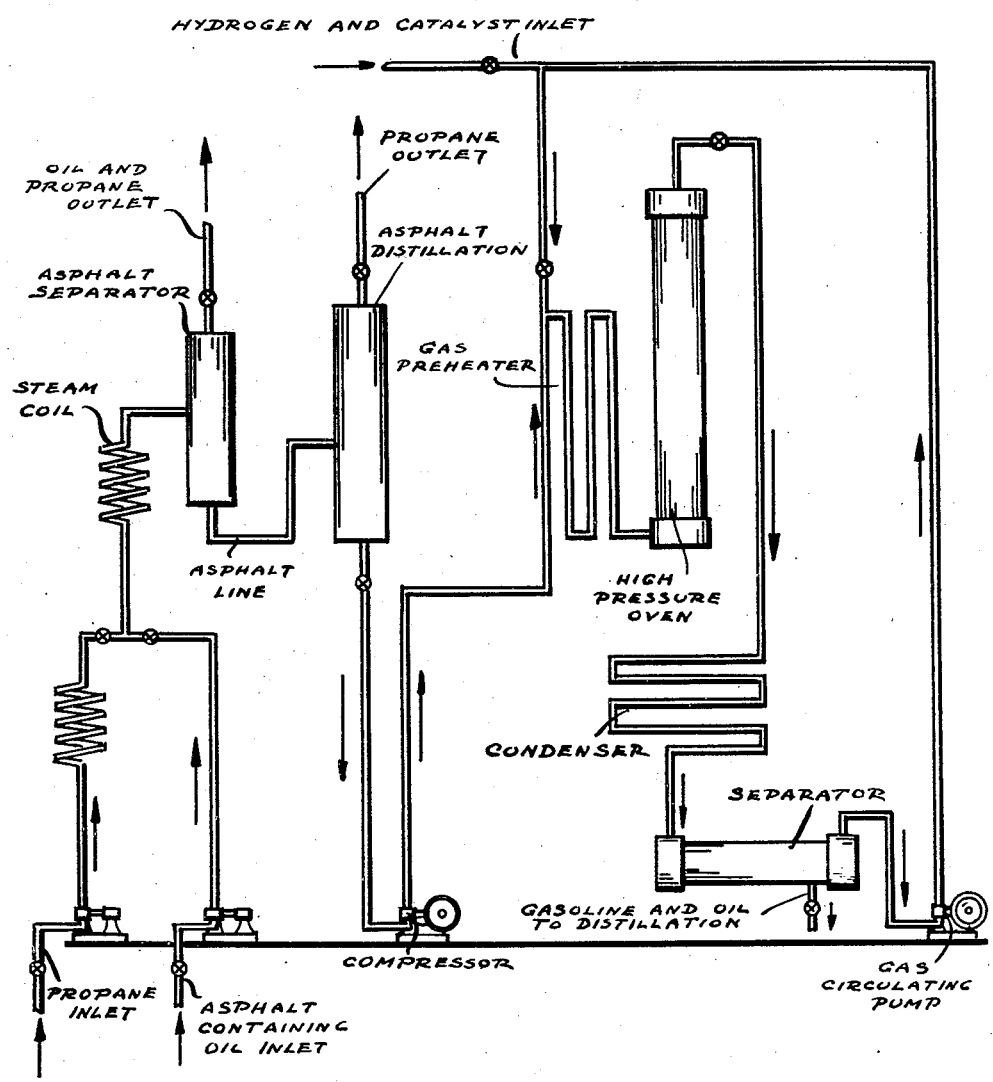

2,177,376

UNITED STATES PATENT OFFICE 2,177,376

PRODUCTION OF VALUABLE HYDROCARBON PRODUCTS

Mathias Pier, Heidelberg, Walter Simon, Ludwigshafen-on-the-Rhine, and August Eisenhut, Heidelberg, Germany, assignors to Standard-I. G. Company, Linden, N. J., a corporation of Delaware Application February 4, 1937, Serial No. 124,030
In Germany February 6, 1936

1 Claim. (Cl. 196—53)

Our present invention relates to the production of valuable hydrocarbon products and more particularly to the production of hydrocarbon oils, especially high boiling oils, from asphaltic substances by catalytic destructive hydrogenation.

It has already been proposed to convert asphaltic substances by catalytic destructive hydrogenation into valuable, in particular liquid, organic compounds. It has further been proposed to treat crude tars or mineral oils with organic solvents having a selective solvent power for the different constituents of the crude oils and to convert the constituents poor in hydrogen thus separated into low boiling hydrocarbons, suitable for use as motor fuels, by catalytic destructive hydrogenation. Tars, mineral oils and their distillation or conversion products also have already been subjected to a catalytic treatment with hydrogenating gases under pressure and at elevated temperature in the presence of catalysts comprising halogens, hydrogen halides and/or halides of solid metalloids.

We have now found that in the conversion of asphaltic substances into valuable hydrocarbon products by a catalytic destructive hydrogenation under pressure with hydrogenating gases, namely hydrogen or gases containing or supplying hydrogen, in the presence of catalysts comprising halogen, namely halogens, hydrogen halides and/or substances splitting off halogens or hydrogen halides under the reaction conditions, such as halides of solid metalloids, organic halides or ammonium chloride the catalytic action of the halogen is surprisingly strong and effective, if such asphaltic or asphalt-like substances are subjected to destructive hydrogenation as have been separated from materials of any origin, containing such substances, by a treatment with aliphatic hydrocarbons having a low boiling point. Preferably hydrocarbons which are gaseous at ordinary temperature are employed in a liquefied state for the separation treatment.

The said destructive hydrogenation is preferably carried out under such mild conditions that no considerable splitting to gasoline takes place. Tars such as low temperature tar or coke oven tar, asphalt base and mixed base crude mineral oils, distillation residues or heavy fractions of said crude oils, or products containing asphalt or asphalt-like substances obtained in the destructive hydrogenation of carbonaceous materials such as bituminous coal or lignite, or products obtained by extracting various sorts of coal such as bituminous coal or lignite and the like with solvents such as middle oils, benzene, tetrahydronaphthalene and the like, are examples of suitable initial materials for treatment according to the present invention.

Typical examples of the said low boiling aliphatic hydrocarbons employed as agents for the separation of the asphaltic or asphalt-like substances from the initial materials are propane and butane which are employed in a liquefied state. However, also liquefied pentanes and/or hexanes and gasoline fractions having a very low boiling range may be employed as separating agents. In case of initial materials having a high asphalt content liquefied propane or ethane or a mixture of both is a particularly suitable precipitant.

The drawing illustrates in diagrammatic elevation a suitable apparatus for carrying out one modification of the process of this invention, and indicates the flow of materials.

The separating treatment of the asphaltic initial material with these hydrocarbons which will hereinafter be called precipitants, may take place at room temperature or at elevated temperature, and preferably in a closed vessel; the upper limit of temperature is substantially determined by the critical temperature of the precipitant employed. The liquefied hydrocarbons are preferably employed in an amount corresponding to several times the volume of the initial material containing asphalt. The substances chiefly consisting of or containing substantial amounts of asphalt or asphalt-like bodies, which remain undissolved in the said separation treatment, are freed from the adhering volatile precipitant, for example by gentle heating and/or by application of subatmospheric pressure and are then subjected to destructive hydrogenation with hydrogen, or gases containing or supplying hydrogen, under a pressure of 50 to 500 atmospheres or more, at temperatures of between about 300 and about 500° C., suitably at temperatures between about 400 and about 485° C., in the presence of halogen, for example chlorine, bromine or iodine or of hydrogen compounds of these halogens, or of halogen compounds of sulphur, phosphorus, selenium, tellurium or boron and, more particularly, in the presence of volatile, organic halogen compounds such as carbon-tetrachloride or ethylene chloride, or of ammonium halides, for example ammonium chloride. The quantity of halogen may amount to between 0.01 and 5 per cent or more, for example up to 10 per cent of the asphaltic product treated. Besides halogen, one or several other catalysts usual or known in destructive hydrogenation, for example compounds, such as oxides or sulphides, of the metals of the 5th to 8th group of the periodic system, such as molybdenum or tungsten sulphides, or organic or inorganic compounds of tin, germanium or zinc may be employed.

Also substances having a large superficial area, such as brown coal small coke, silica gel, magnesia, bentonite, if desired, activated, for example, by super-heated steam or by a treatment with hydrochloric acid, or impregnated with catalytic material may be employed as additional catalysts according to the present invention.

The destructive hydrogenating treatment may be carried out as a batch process or also as a continuous operation.

The asphaltic products separated by treatment with low boiling hydrocarbons, for example, propane, give a higher yield of high boiling oils of good quality, in destructive hydrogenation, than other initial materials containing asphalt, for example, the asphalt-like residues remaining after distillation, for instance in vacuo, of crude materials containing asphalt. Moreover, less halogen is required for the hydrogenation of these precipitated products than when hydrogenating distillation residues; this is very important from a practical point of view, since halogen may easily cause corrosion of the apparatus, unless special protective measures against corrosive halogen are taken.

The following example will further illustrate the nature of the invention, but the invention is not restricted to said example. The percentages are by weight unless otherwise stated.

Example

A mixture of asphaltic resins and asphalt is precipitated from German crude mineral oil by treating said oil with five times its volume of liquefied propane in a closed vessel. The mixture of resins and asphalt is separated from the oil solution by decantation and from the adhering propane by release of pressure and gentle heating and is then heated at 425° C. during 90 minutes together with hydrogen under an initial pressure of 110 atmospheres in a rotary autoclave after addition of 1 per cent of brown coal small coke, activated with steam, and of 1.15 per cent of ammonium chloride. About 15 per cent of the products obtained distills up to 300° C. The rest is a heavy oil, having a specific gravity of 0.940 at 100° C. and containing only 4 per cent of asphalt.

If, instead of separating the resins and asphalts by precipitation, the initial crude oil is distilled off in vacuo until a residue is obtained, the amount of which corresponds to that of the mixture of resins and asphalt obtained by precipitation with propane, and this residue is subjected to destructive hydrogenation in the same manner as described above, the resulting product also contains 15 per cent of constituents boiling up to 300° C., but the rest is a heavy oil having a specific gravity of 0.955 at 100° C. which contains 10 per cent of asphalt.

What we claim is:

A process for the production of high boiling oils from asphaltic substances by catalytic destructive hydrogenation with hydrogenating gases under pressure, which comprises carrying out the hydrogenation under such mild conditions that no considerable formation of gasoline takes place and in the presence of a catalyst selected from the group of substances consisting of halogen, hydrogen halides and substances splitting off hydrogen halides under the reaction conditions, the asphaltic substances subjected to the hydrogenation having been separated from hydrocarbon oils containing them, by the treatment of said oils with aliphatic hydrocarbons having a low boiling point.

MATHIAS PIER.
WALTER SIMON.
AUGUST EISENHUT.